US008345166B2

(12) United States Patent
Kawai et al.

(10) Patent No.: US 8,345,166 B2
(45) Date of Patent: Jan. 1, 2013

(54) BROADCAST RECEIVING CIRCUIT AND BROADCAST RECEIVING APPARATUS

(75) Inventors: Hiroki Kawai, Shiga (JP); Keiichi Kuroda, Kyoto (JP); Shuichi Takayama, Hyogo (JP)

(73) Assignee: Panasonic Corporation, Osaka (JP)

( * ) Notice: Subject to any disclaimer, the term of this patent is extended or adjusted under 35 U.S.C. 154(b) by 90 days.

(21) Appl. No.: 13/099,745

(22) Filed: May 3, 2011

(65) Prior Publication Data

US 2011/0205443 A1   Aug. 25, 2011

Related U.S. Application Data

(63) Continuation of application No. PCT/JP2009/005685, filed on Oct. 28, 2009.

(30) Foreign Application Priority Data

Nov. 7, 2008   (JP) ................................ 2008-287080

(51) Int. Cl.
*H04N 5/268* (2006.01)
(52) U.S. Cl. ........................................ 348/706; 348/738
(58) Field of Classification Search .................. 348/738, 348/705–706, 725, 731, 553–555; 725/25, 725/38; *H04N 5/268*
See application file for complete search history.

(56) References Cited

U.S. PATENT DOCUMENTS

| 6,633,325 | B1 * | 10/2003 | Lee ................................. | 348/21 |
| 7,061,542 | B1 * | 6/2006 | Ikeguchi ....................... | 348/558 |
| 7,567,565 | B2 * | 7/2009 | La Joie ......................... | 370/390 |
| 7,715,566 | B2 * | 5/2010 | Seo .................................... | 381/2 |
| 2006/0101065 | A1 | 5/2006 | Tsutsui et al. | |
| 2009/0103603 | A1 * | 4/2009 | Hamano .................. | 375/240.01 |

FOREIGN PATENT DOCUMENTS

| JP | 2005-340935 | 12/2005 |
| JP | 2006-139408 | 6/2006 |
| JP | 2006-270824 | 10/2006 |
| JP | 2007-129578 | 5/2007 |
| JP | 2007-295468 | 11/2007 |
| JP | 2007-306521 | 11/2007 |
| JP | 2008-154062 | 7/2008 |

OTHER PUBLICATIONS

International Search Report, mailed Jan. 12, 2010, for the corresponding International Patent Application No. PCT/JP2009/005685.

* cited by examiner

*Primary Examiner* — Trang U Tran
(74) *Attorney, Agent, or Firm* — McDermott Will & Emery LLP (57) ABSTRACT

A broadcast receiving apparatus in the present invention includes: a first audio data characteristics extracting unit extracting a first soundless period and first interval information from first audio data included in the first service; a second audio data characteristics extracting unit extracting a second soundless period and second interval information from second audio data included in the second service; a simulcast determining unit determining whether or not the broadcast waves are simulcast by comparing the first interval information with the second interval information; and a broadcasting switching control unit switching between (i) the output of the audio data and the video data included in the first service and (ii) the output of the audio data and the video data included in the second service based on a result of the determination by the simulcast determining unit.

9 Claims, 9 Drawing Sheets

BROADCAST RECEIVING CIRCUIT AND BROADCAST RECEIVING APPARATUS

CROSS REFERENCE TO RELATED APPLICATION

This is a continuation application of PCT application No. PCT/JP2009/005685 filed on Oct. 28, 2009 designating the United States of America.

BACKGROUND OF THE INVENTION (1) Field of the Invention

The present invention relates to broadcast receiving circuits and broadcast receiving apparatuses and, in particular, to a broadcast receiving circuit and a broadcast receiving apparatus capable of switching among services received in digital broadcasting for viewing the services.

(2) Description of the Related Art

The Japanese terrestrial digital TV broadcasting system has each frequency band for one channel divided into 13 segments. For stable reception of programs on mobile receivers, such as cellular phones, one of the 13 segments is left for the mobile receivers. This is called the One-Segment broadcasting service (hereinafter referred to as One-Seg broadcasting). Other than the one segment for the One-Seg broadcasting, the rest of the 12 segments are used to provide a service (hereinafter referred to as the 12-Seg broadcasting) for receiving a high-definition television (HDTV) broadcast with a stationary TV. The 12-Seg broadcasting is not as capable as the One-Seg broadcasting in terms of stable reception. The 12-Seg broadcasting and the One-Seg broadcasting, each of which employs a different kind of coding technique, usually provide the same program at the same time. Such broadcasting is referred to as the simulcast.

Some on-vehicle digital broadcast receiving apparatuses receive digital broadcasts, taking advantage of the feature of the simulcast. The on-vehicle digital broadcast receiving apparatuses use a technique to switch between the 12-Seg broadcasting and the One-Seg broadcasting, and provide the selected broadcasting on a display apparatus, such as a monitor, depending on a reception condition of the digital broadcasting. This technique allows the program to be continuously provided to the viewers regardless of the reception condition of the digital broadcasting.

In Japan, however, the simulcast is not mandatory in operating a broadcast station. Thus the 12-Seg broadcasting and the One-Seg broadcasting could provide different programs at the same time. Hence when a viewer unconditionally switches from the 12-Seg broadcasting to the One-Seg broadcasting on the assumption that the broadcastings are simulcast, the program which the viewer is watching might be switched to another program that the viewer is not expecting. This makes the viewer feel uncomfortable.

Taking such a problem into consideration, a proposed broadcast receiving apparatus determines whether or not the simulcast is provided on the same channel, and, in the case where the apparatus determines that the simulcast is provided, the proposed broadcast receiving apparatus switches between the 12-Seg broadcasting and the One-Seg broadcasting to provide the selected broadcasting (See Patent Reference 1: Japanese Unexamined Patent Application Publication No. 2007-295468).

In order to detect whether or not the program is simulcast, the Patent Reference 1 compares a soundless period of audio data included in the 12-Seg broadcasting with that of audio data included in the One-Seg broadcasting. The Patent Reference 1 assumes the case where a soundless state continues as long as a predetermined time period or longer. Specifically, assumed is the case where a Transmission and Multiplexing Configuration Control (TMCC) signal, which is included in a broadcast wave in advance, has control information transferred thereto. Here the control information indicates whether or not the program is simulcast. Then, at a receiver, assumed is a case where (i) the control information is referred to, and (ii) a decode error has developed due to bad reception in both of the 12-Seg broadcasting and the One-Seg broadcasting.

SUMMARY OF THE INVENTION

The broadcast receiving apparatus of the above Patent Reference 1 cannot exactly determine whether or not the simulcast is provided.

The technique disclosed in the Patent Reference 1 detects partial reception only using the information of a partial reception flag (B27/B26) included in a TMCC signal so as to determine that the simulcast is provided. However, not all broadcast stations set information in the TMCC signal, the information which indicates how the simulcast is provided. Thus even though the simulcast is provided, the broadcast receiving apparatus cannot determine whether or not the simulcast is actually provided.

In the Patent Reference 1, the only cases when the soundless state continues are where (i) either one of the 12-Seg broadcasting or the One-Seg broadcasting is not aired, and (ii) both of the 12-Seg broadcasting or the One-Seg broadcasting are suffering from bad reception, and decode errors develop. In addition to the above cases, some simulcast programs could have a continued soundless state, depending on the stories of the programs. In such a case, it is difficult to tell the soundless state from a decode error. Thus even though a program is not simulcast, the technique disclosed in the Patent Reference 1 incorrectly determines the program as a simulcast one.

The present invention is conceived in view of the above problems and has as an object to provide a broadcast receiving circuit and a broadcast receiving apparatus which can exactly determine whether or not a broadcast program is simulcast.

In order to achieve the above object, a broadcast receiving circuit receives broadcast waves including a first service and a second service, and outputs either (i) audio data and video data included in the first service or (ii) audio data and video data included in the second service. The broadcast receiving circuit includes: a first extracting unit which extracting a first soundless period and first interval information from a first audio data included in the first service, the first soundless period showing that an audio level which indicates volume of audio is as low as a predetermined audio level or below, and the first interval information indicating a time period between the first soundless period and a soundless period subsequent to the first soundless period; a second extracting unit which extracting a second soundless period and second interval information from a second audio data included in the second service, the second soundless period showing that an audio level which indicates volume of audio is as low as a predetermined audio level or below, and the second interval information indicating a time period between the second soundless period and a soundless period subsequent to the second soundless period; a simulcast determining unit which determines whether or not the broadcast waves are simulcast by comparing the first interval information with the second interval information; and a switching control unit which switches between (i) the output of the audio data and the video data included in the first service and (ii) the output of the audio data and the video data included in the second service based on a result of the determination by the simulcast determining unit. Here the data is included in a signal in a broadcast wave.

In stead of being introduced as an apparatus, the present invention may also be introduced as a circuit or an integrated circuit including processing units which the apparatus has, as a method utilizing the processing units as steps, and as a program product which allows a computer to execute the steps.

The present invention can be introduced as a broadcast receiving apparatus and a broadcast receiving circuit which can exactly determine whether or not a broadcast program is simulcast.

FURTHER INFORMATION ABOUT TECHNICAL BACKGROUND TO THIS APPLICATION

The disclosure of Japanese Patent Application No. 2008-287080 filed on Nov. 7, 2008 including specification, drawings and claims is incorporated herein by reference in its entirety.

The disclosure of PCT application No. PCT/JP2009/005685 filed on Oct. 28, 2009, including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE PREFERRED EMBODIMENTS (Embodiment 1)

Described hereinafter are a broadcast receiving circuit and a broadcast receiving apparatus in the present invention, with reference to the drawings. It is noted the broadcast receiving apparatus will be described as an on-vehicle broadcast receiving apparatus; however, the broadcast receiving apparatus shall not be limited to an on-vehicle apparatus. The broadcast receiving apparatus may be used as a household appliance and a mobile device. Specifically, examples of the broadcast receiving apparatus in the present invention include, but not limited to, the following descriptions. Any modification is possible as far as the modification shall not depart from a technical scope of the present invention. The broadcast receiving apparatus in the present invention is assumed to be capable of receiving Japanese digital terrestrial broadcasts.

The terrestrial digital TV broadcast system in Japan provides a bandwidth for one channel divided into 13 segments. Twelve of the 13 segments are allocated for stationary TV services, and the remaining one segment is allocated for cellular phone (for example, a mobile receiving terminal) services. In other words, the terrestrial digital TV broadcast system in Japan offers the 12-Seg broadcasting used for the stationary TV services and the One-Seg broadcasting used for cellular phone services.

Concurrently, the One-Seg broadcasting employs H.264 for video, and MPEG-2 AAC+SBR for audio. MPEG-2 AAC+SBR can sample a high frequency band at a low bit rate.

Compared with the coded data for the One-Seg broadcasting, the coded data for the 12-Seg broadcasting is high in quality because of a high bit rate. Thus the coded data for the 12-Seg broadcasting is low in noise resistance, and susceptible to a greater distance to a broadcast station and to obstacles nearby. Hence it could be difficult to keep having a good reception when a viewer receives the 12-Seg broadcasting on a mobile receiving terminal. On the contrary, the coded data for the One-Seg broadcasting is lower in bit rate and higher in noise resistance than that for the 12-Seg broadcasting. Thus the coded data for the One-Seg broadcasting is insusceptible to a great distance from the broadcast station, and to obstacles nearby. Accordingly, the viewer can keep having better reception with the mobile receiving terminal on the One-Seg broadcasting than on the 12-Seg broadcasting.

Figure 1:
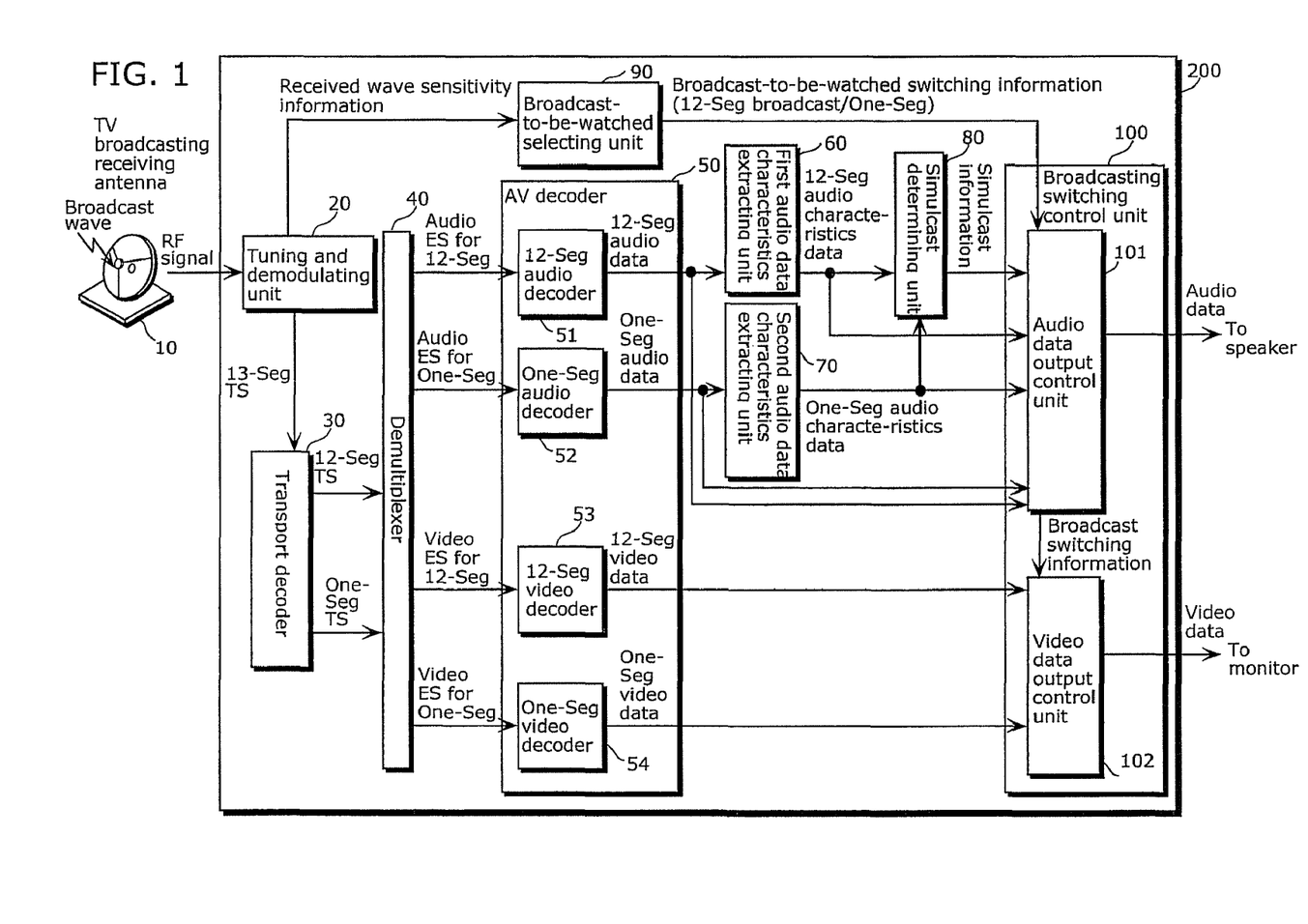
FIG. 1 is a block diagram showing a structure of a broadcast receiving apparatus in the present invention.

FIG. 1 is a block diagram showing a structure of a broadcast receiving apparatus in the present invention.

A broadcast receiving apparatus 200 in the present invention is capable of simultaneously receiving, via a TV broadcasting receiving antenna 10, the 12-Seg broadcasting and the One-Seg broadcasting both included in one channel. The broadcast receiving apparatus 200 is also capable of exactly detecting whether or not a program is simulcast; that is, the same program is aired on the received 12-Seg broadcasting and One-Seg broadcasting.

As shown in FIG. 1, the broadcast receiving apparatus 200 includes a tuning and demodulating unit 20, a transport decoder 30, a demultiplexer 40, an audio-visual (AV) decoder 50, a first audio data characteristics extracting unit 60, a second audio data characteristics extracting unit 70, a simulcast determining unit 80, a broadcast-to-be-watched selecting unit 90, and a broadcasting switching control unit 100.

The tuning and demodulating unit 20 extracts, from a Radio Frequency (RF) signal received by the TV broadcasting receiving antenna 10, an Orthogonal Frequency Division Multiplexing (OFDM) signal found in a received bandwidth of a designated channel. The tuning and demodulating unit 20 demodulates the extracted OFDM signal to obtain a digital signal of an airwave on a designated specific channel. The tuning and demodulating unit 20 extracts a 13-Seg Transport Stream (TS) from the digital signal, and provides the 13-Seg TS to the transport decoder 30. Here the 13-Seg TS includes the 12-Seg broadcasting and the One-Seg broadcasting. Moreover, the tuning and demodulating unit 20 detects received wave sensitivity information of the RF signal received by the TV broadcasting receiving antenna 10, and outputs the detected received wave sensitivity information to the broadcast-to-be-watched selecting unit 90.

The transport decoder 30 extracts each of a 12-Seg TS and a One-Seg TS from the 13-Seg TS extracted by the tuning and demodulating unit 20. The transport decoder 30 provides the extracted 12-Seg TS and One-Seg TS to the demultiplexer 40.

The demultiplexer 40 extracts a video elementary stream (ES) for 12-Seg and an audio ES for 12-Seg from the 12-Seg TS provided by the transport decoder 30. Both of the elementary streams are used for the 12-Seg broadcasting. The demultiplexer 40 also extracts a video ES for One-Seg and an audio ES for One-Seg from the One-Seg TS provided by the transport decoder 30. Both of the elementary streams are used for the One-Seg broadcasting. Then the demultiplexer 40 supplies to the AV decoder 50 the extracted elementary streams.

An example in FIG. 1 shows, but not limited, that the transport decoder 30 extracts to generate the two streams; namely the 12-Seg TS and the One-Seg TS, and provides the generated streams to the demultiplexer 40. For example, the transport decoder 30 may supply the 13-Seg TS, provided from the tuning and demodulating unit 20, to the demultiplexer 40 as it is. Then the demultiplexer 40 may extract, from the 13-Seg TS, the video ES for 12-Seg, the audio ES for 12-Seg, the video ES for One-Seg, and the audio ES for One-Seg.

The AV decoder 50 includes a 12-Seg audio decoder 51, a 12-Seg video decoder 53, a One-Seg audio decoder 52, and a One-Seg video decoder 54. The audio decoder 51 and the video decoder 53 are used for the 12-Seg broadcasting. The audio decoder 52 and the video decoder 54 are used for the One-Seg broadcasting. The above structure allows the AV decoder 50 to simultaneously decode the 12-Seg broadcasting and the One-Seg broadcasting.

The 12-Seg audio decoder 51 decodes the audio ES for 12-Seg which has been coded with MPEG-2-AAC and provided by the demultiplexer 40. The One-Seg audio decoder 52 decodes the audio ES for One-Seg which has been coded with MPEG-2-AAC+SBR and provided by the demultiplexer 40. The video decoder 53 for One-Seg decodes the video ES for 12-Seg which has been coded with MPEG-2-Video and provided by the demultiplexer 40. The video decoder 54 for One-Seg decodes the video ES for One-Seg which has been coded with H.264 and provided by the demultiplexer 40.

Out of audio data for the 12-seg broadcasting (hereinafter referred to as 12-Seg audio data), which is decoded and provided by the 12-Seg audio decoder 51, the first audio data characteristics extracting unit 60 generates to output audio characteristics data of the 12-Seg audio data. Specifically, the first audio data characteristics extracting unit 60 determines whether or not the 12-Seg audio data, provided from the 12-Seg audio decoder 51, is either in a sound-producing state or in a soundless state, and extracts a soundless period included in the audio data. Furthermore, the first audio data characteristics extracting unit 60 obtains interval information showing the development of the soundless period interval. Here the interval information is a soundless period indicating a differential time period between the finish time of a soundless period and the start time of the next soundless period. Moreover, the first audio data characteristics extracting unit 60 outputs 12-Seg audio characteristics data including the extracted soundless period and the obtained interval information.

Out of audio data for the One-seg broadcasting (hereinafter referred to as One-Seg audio data), which is decoded and provided by the One-Seg audio decoder 52, the second audio data characteristics extracting unit 70 generates to output audio characteristics information of the One-Seg audio data. Specifically, the second audio data characteristics extracting unit 70 determines whether or not the One-Seg audio data, provided from the One-Seg audio decoder 52, is either in a sound-producing state or in a soundless state, and extracts a soundless period included in the audio data. Furthermore, the second audio data characteristics extracting unit 70 obtains interval information showing the development of the soundless period. Here the interval information indicates a soundless period interval found between the finish time of a soundless period and the start time of the next soundless period. Moreover, the second audio data characteristics extracting unit 70 provides One-Seg audio characteristics data including the extracted soundless period and the obtained interval information.

The simulcast determining unit 80 compares the 12-Seg audio characteristics data provided from the first audio data characteristics extracting unit 60 with the One-Seg audio characteristics data provided from the second audio data characteristics extracting unit 70. The simulcast determining unit 80 outputs simulcast information indicating (i) a simulcasting state (simulcast on-air information) when both of the 12-Seg and One-Seg audio characteristics data are similar, and (ii) a non-simulcasting state (simulcast off-air information) when the 12-Seg and One-Seg audio characteristics data are not similar.

Based on the received wave sensitivity information detected by the tuning and demodulating unit 20, the broadcast-to-be-watched selecting unit 90 determines appropriate broadcasting out of the 12-Seg broadcasting and the One-Seg broadcasting. The broadcast-to-be-watched selecting unit 90 outputs necessity-of-broadcast-to-be-watched information and broadcasting-to-be-switched-to information as broadcast-to-be-watched-switching information. The necessity-of-broadcast-to-be-watched information indicates whether or not the broadcasting needs to be switched. The selected broadcast information indicates whether or not the broadcasting to be switched to is either the 12-Seg broadcasting or the One-Seg broadcasting.

One of approaches to select the appropriate broadcasting is to select the 12-Seg broadcasting when the receptions are good in both of the 12-Seg broadcasting and the One-Seg broadcasting, so that the viewer can enjoy a higher-definition video. When the reception goes so poor that noise develops in the 12-Seg broadcasting, there is another approach in that the broadcast-to-be-watched selecting unit 90 determines that the broadcasting should be switched from the 12-Seg broadcasting to the One-Seg broadcasting, and selects the One-Seg broadcasting as the broadcasting. There is another approach to select the appropriate broadcasting: The viewer gives a command to the broadcast-to-be-watched selecting unit 90 via a remote control external input I/F, so that the appropriate broadcasting is selected, for example.

The broadcasting switching control unit 100 includes an audio data output control unit 101 and a video data output control unit 102. The broadcasting switching control unit 100 outputs, to a monitor and a speaker, either (i) audio and video information of the 12-Seg broadcasting or (ii) audio and video information of the One-Seg broadcasting.

Based on the simulcast information input from the simulcast determining unit 80 and the broadcast-to-be-watched-switching information input from the broadcast-to-be-watched selecting unit 90, the audio data output control unit 101 selects either the 12-Seg audio data decoded by the 12-Seg audio decoder 51 or the One-Seg audio data decoded by the One-Seg audio decoder 52, and outputs the selected data as the audio data. Furthermore, the audio data output control unit 101 outputs, to the video data output control unit 102, broadcasting kind information and broadcasting switching timing information as broadcast switching information.

The broadcasting kind information indicates whether the broadcasting for the output audio data is either for the 12-Seg broadcasting or the One-Seg broadcasting. The broadcasting switching timing information is used to switch between the 12-Seg video data output and the One-Seg video data output in conjunction with the output audio data.

Based on the broadcast switching information input from the audio data output control unit 101, the video data output control unit 102 selects either the 12-Seg video data decoded by the One-Seg video decoder 53 or the One-Seg video data decoded by the One-Seg video decoder 54, and outputs the selected video data to the monitor.

The broadcast receiving apparatus 200 is structured as described above.

Exemplified next is how the first audio data characteristics extracting unit 60 and the second audio data characteristics extracting unit 70 respectively generate the 12-Seg audio characteristics data and the One-Seg audio characteristics data. It is noted that the One-Seg audio characteristics data and the 12-Seg audio characteristics data are used by the simulcast determining unit 80, so that the simulcast determining unit 80 can determine whether or not the program is simulcast.

Figure 2:
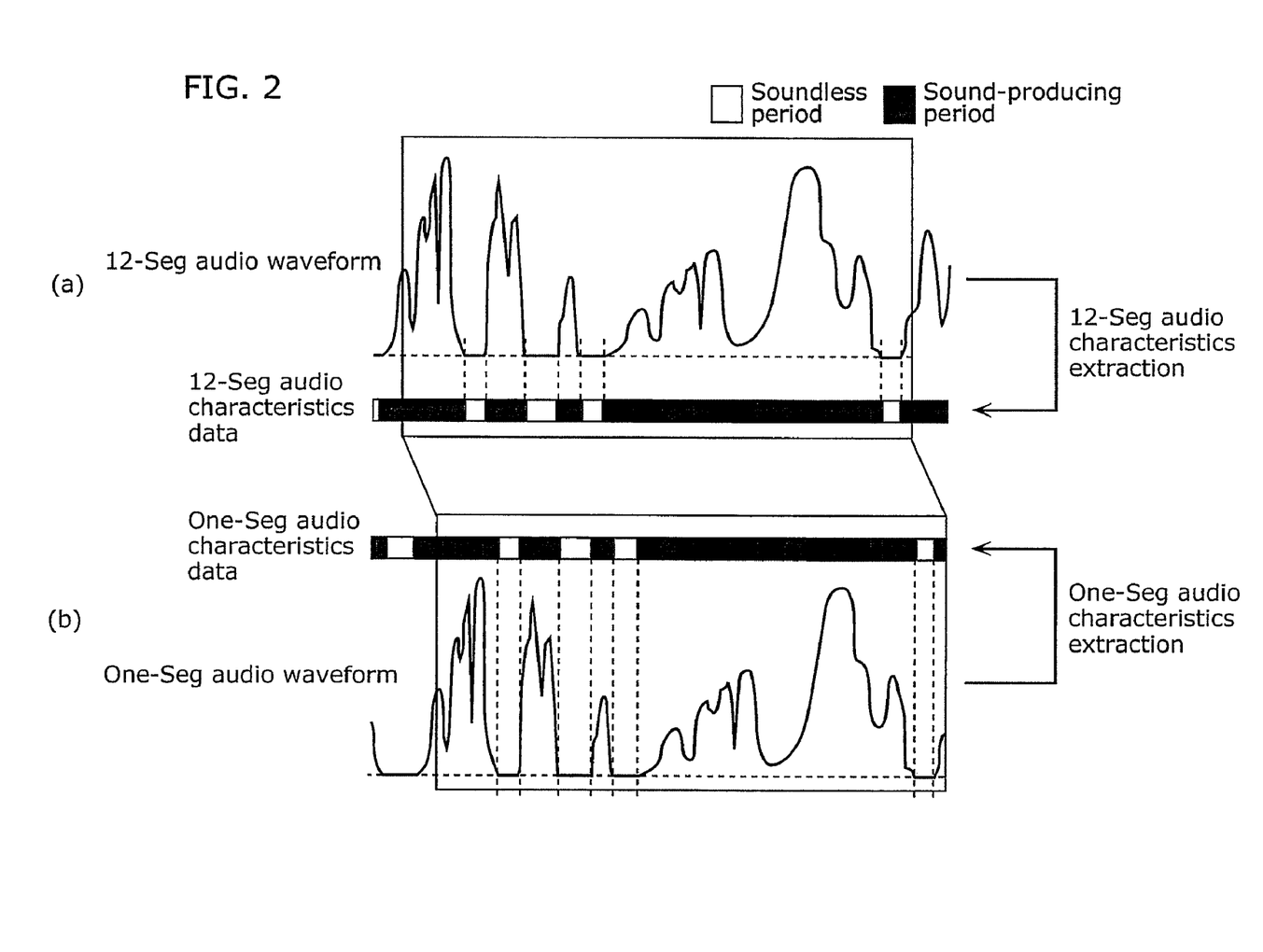
FIG. 2 conceptually shows how audio characteristics data is extracted from an audio wave.

FIG. 2 conceptually shows how the audio characteristics data is extracted from a speech wave.

As described above, the first audio data characteristics extracting unit 60 determines whether or not the 12-Seg audio data, provided from the 12-Seg audio decoder 51, is either in the sound-producing state or in the soundless state. The second audio data characteristics extracting unit 70 determines whether or not the One-Seg audio data, provided from the One-Seg audio decoder 52, is either in the sound-producing state or in the soundless state.

As shown in (a) in FIG. 2, the first audio data characteristics extracting unit 60 converts the 12-Seg audio data, provided from the 12-Seg audio decoder 51, into audio wave information. When the audio wave is as low as the audio level equivalent to the soundless state or below, the first audio data characteristics extracting unit 60 determines the audio data to be in the soundless state. According to the soundless state, the first audio data characteristics extracting unit 60 detects the soundless period. As shown in (b) in FIG. 2, the second audio data characteristics extracting unit 70 determines the soundless state of the One-Seg audio data as the first audio data characteristics extracting unit 60 determines that of the 12-Seg audio data. According to the soundless state, the second audio data characteristics extracting unit 70 detects the soundless period. It is noted that the soundless state may be determined by another technique.

Here (a) and (b) in FIG. 2 show that the 12-Seg audio data and the waveform thereof are temporally behind the One-Seg audio data and the waveform thereof. This is how the simulcast system is operated in Japan. The drawings (a) and (b) in FIG. 2 show the operational characteristics.

Figure 3:
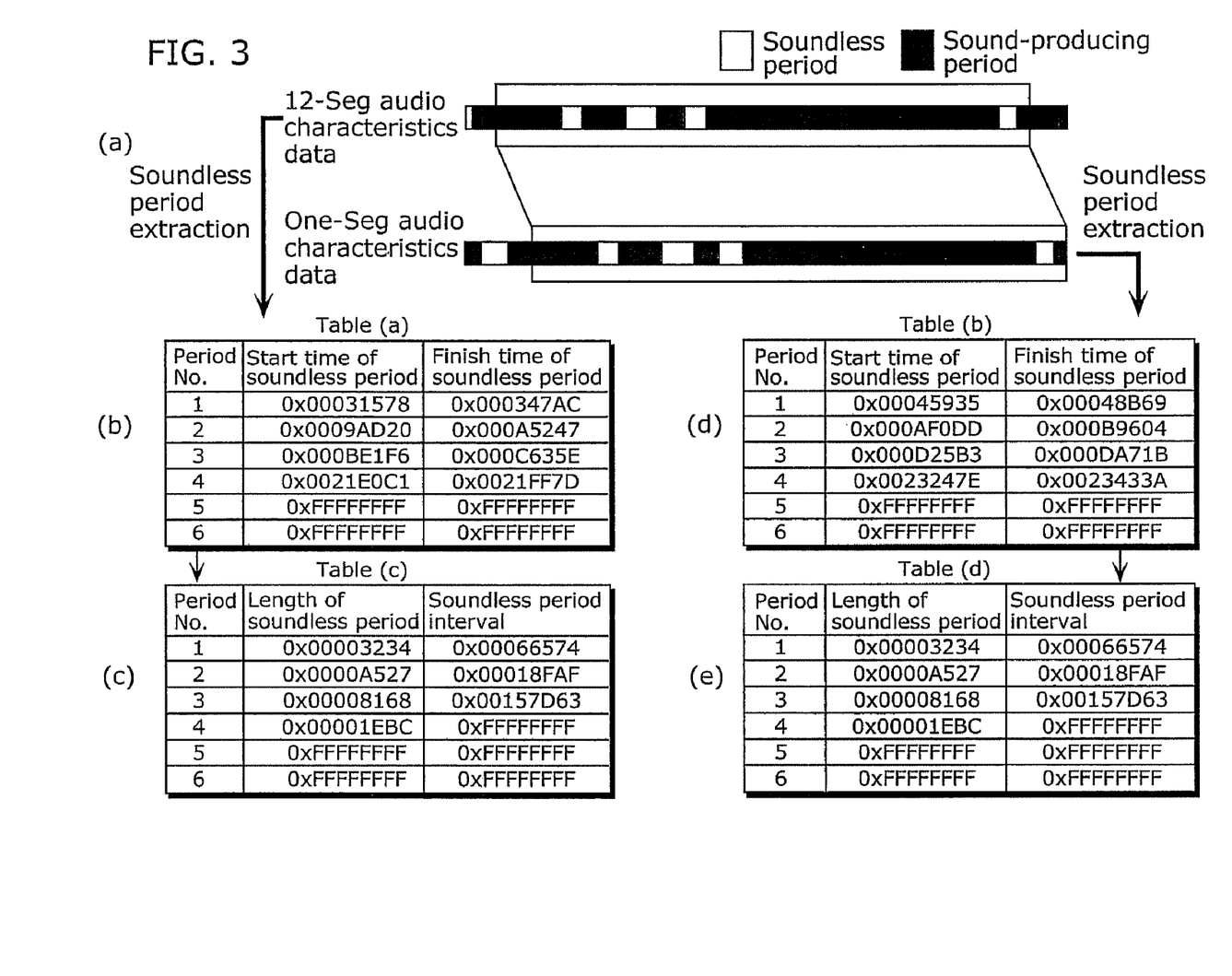
FIG. 3 shows how to generate the audio characteristics data out of an extracted soundless period.

FIG. 3 shows how to generate the audio characteristics data out of the extracted soundless period.

Table (a) shown in (b) in FIG. 3 is a 12-Seg audio soundless period managing table. Table (a) shows the extracted information on the soundless period detected out of the audio wave obtained through the conversion of the 12-Seg audio data. Table (b) shown in (d) in FIG. 3 is a One-Seg audio soundless period managing table. Table (b) shows the extracted information on the soundless period detected out of the audio wave obtained through the conversion of the One-Seg audio data.

For each of the 12-seg audio data and the One-Seg audio data, the information on the extracted soundless period is indicated using the following three pieces of information; period Nos. assigned in ascending and detecting order, a soundless period start time indicating the start time of the soundless period corresponding to the associated period No., and a soundless period finish time indicating the finish time of the soundless period corresponding to the associated period No. It is noted that the soundless period may be indicated in other techniques, such as a combination of the soundless period start time and information on the interval period.

FIG. 3 (*b*) to FIG. 3 (*e*) show the soundless period start times and the soundless period finish times in hexadecimal. In FIG. 3 (*b*) to FIG. 3 (*e*), 0×FFFFFFFF shows no relevant soundless period.

Table (c) shown in (c) in FIG. 3 is 12-Seg audio characteristics data generated out of Table (a) in (b) shown in FIG. 3. Table (c) is also a table for managing the 12-Seg audio characteristics data. The 12-Seg audio characteristics data manages (i) the length of the 12-Seg audio soundless period and (ii) the audio soundless period interval both included in the 12-Seg audio characteristics data.

The information to be managed with the table used for managing the 12-Seg audio characteristics data is generated based on Table (a) in (b) shown in FIG. 3; namely, the 12-Seg audio soundless period managing table. Specifically, the table for managing the 12-Seg audio characteristics data shown in Table (c) in (c) in FIG. 3 manages the length of the soundless period and the soundless period interval for each of the period Nos. assigned in ascending order. The length of the soundless period is obtained from information indicating the difference between the finish time and the start time of a soundless period which corresponds to an associated period No. in Table (a) managing the 12-Seg audio soundless period. The soundless period interval is obtained from information indicating the difference between the start time and the finish time of a soundless period which corresponds to an associated period No. in Table (a) managing the 12-Seg audio soundless period.

The data in the table managing the 12-Seg audio characteristics data shown in generated Table (c) of (c) in FIG. 3 is outputted from the first audio data characteristics extracting unit 60 as the 12-Seg audio characteristics data.

On the other hand, Table (d) in (e) in FIG. 3 shows the One-Seg audio characteristics data generated based on Table (b) in (d) in FIG. 3. Table (d) is also a table for managing the One-Seg audio characteristics data. The One-Seg audio characteristics data manages the length of the One-Seg audio soundless period and the audio soundless interval both included in the One-Seg audio characteristics data. The technique to generate Table (d) in (e) in FIG. 3 and the information managed with the table managing the One-Seg audio characteristics data are similar to those shown in the table managing the 12-Seg audio characteristics data. Therefore, the details thereof shall be omitted.

The data in the table managing the One-Seg audio characteristics data shown in generated Table (d) in (e) in FIG. 3 is outputted from the second audio data characteristics extracting unit 70 as the One-Seg audio characteristics data.

Described next is how the simulcast determining unit 80 determines whether or not a program is simulcast.

Whether the program is simulcast or not is determined using (i) the table (data) for managing the 12-Seg audio characteristics data outputted from the first audio data characteristics extracting unit 60, and (ii) the table (data) for managing the One-Seg audio characteristics data outputted from second audio data characteristics extracting unit 70.

Figure 4:
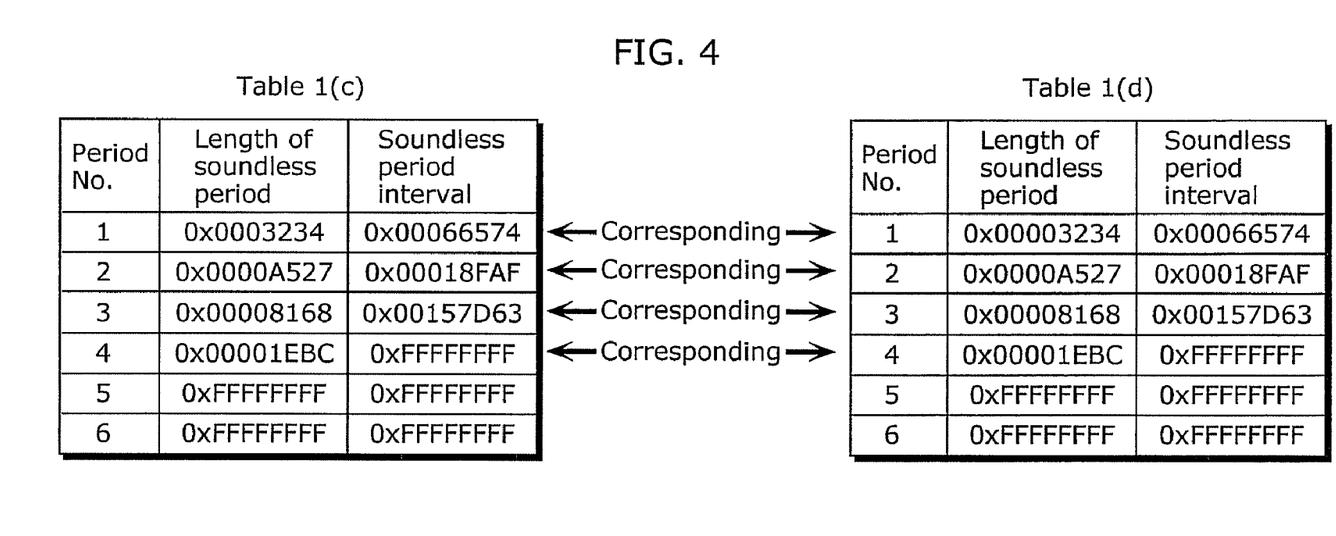
FIG. 4 shows how a simulcast determining unit determines whether or not a program is simulcast.

FIG. 4 shows how the simulcast determining unit 80 determines whether or not the program is simulcast. FIG. 4 details the determination technique. The simulcast determining unit 80 compares the length of the soundless period with the soundless period interval for each period No. included in tables for managing the One-Seg audio characteristics data and the 12-Seg audio characteristics data. Then the simulcast determining unit 80 determines that the program is simulcast only in the case where the length of the soundless period and the soundless period interval in the One-Seg audio characteristics data correspond to those in the 12-Seg data for all the period Nos. included in the tables.

Based on the similarity obtained through the comparison between the audio characteristics data, the simulcast determining unit 80 determines whether or not the program is simulcast.

Regarding a simulcast determining technique, other techniques than the above technique may be used as specific techniques to compare similarities between the audio characteristics data.

Exemplified next is how the audio data output control unit 101 selects audio data to be outputted.

Figure 5:
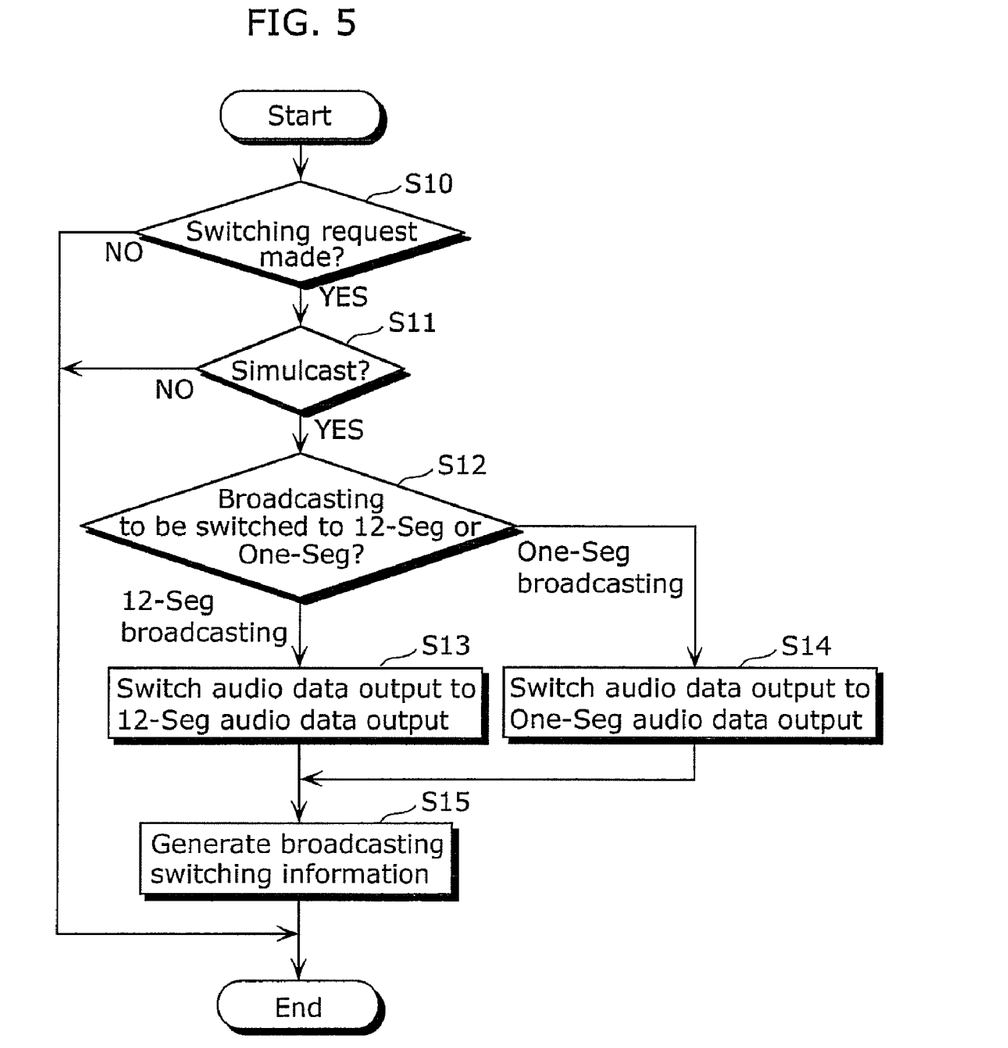
FIG. 5 is a flowchart showing a process executed by an audio data output control unit.

FIG. 5 is a flowchart showing a process executed by the sound data output control unit 101.

First, the audio data output control unit 101 obtains the broadcast-to-be-watched-switching information outputted from the broadcast-to-be-watched selecting unit 90. Then, based on the broadcast-to-be-watched-switching information, the audio data output control unit 101 determines whether or not a switching request between the 12-Seg audio data and the One-Seg audio data is made (S10).

Exemplified here is a determination technique in S10. Specifically, in a storage area of the broadcast receiving apparatus 200, storage is reserved for audio data. When the audio data to be outputted is for the One-Seg audio data, a "0" is recorded. When the audio data to be outputted is for the 12-Seg audio data, a "1" is recorded. The broadcast-to-be-watched-switching information outputted from the broadcast-to-be-watched selecting unit 90 is represented in binary. In such a case, when, in S10, the number in the storage for audio data does not correspond to the number of broadcast-to-be-watched-switching information outputted from the broadcast-to-be-watched selecting unit 90, the audio data output control unit 101 determines that the broadcast-to-be-watched has been switched, and the step proceeds to S11. When the numbers correspond, the process ends.

Next, when the audio data output control unit 101 determines that the broadcasting switching request has been made, the audio data output control unit 101 uses the simulcast information outputted from the simulcast determining unit 80 to determine whether or not the program is simulcast (S11). When the audio data output control unit 101 determines that no broadcasting switching request is made, the process ends.

Exemplified here is a determination technique in S11. When the simulcast determining unit 80 determines that (i) the program is simulcast, the output simulcast information represents a "1", and (ii) the program is not simulcast, the output simulcast information represents a "0". When receiving the "1" from the simulcast determining unit 80 based on the binary information, the audio data output control unit 101 writes the number of the broadcast-to-be-watched-switching information outputted from the broadcast-to-be-watched selecting unit 90 over the number of broadcast-to-be-watched-switching information obtained in S10. Then the process proceeds to S12. When the audio data output control unit 101 receives the "0" from the simulcast determining unit 80, the process ends.

It is noted that how the simulcast determining unit 80 outputs the simulcast information is described later, and the details shall be omitted here.

Next, when determining in S11 that the program is simulcast, the audio data output control unit 101 specifies whether the broadcasting to be switched to is the 12-Seg broadcasting or the One-Seg broadcasting (S12).

Exemplified here is a specifying technique in S12. The audio data output control unit 101 specifies the broadcasting to be switched according to the broadcast-to-be-watched-switching information obtained in S11. When the broadcast-to-be-watched-switching information is the "1", the process proceeds to S13. When the broadcast-to-be-watched-switching information is "0", the process proceeds to S14.

When specifying that the broadcasting to be switched to is the 12-Seg broadcasting, the audio data output control unit 101 switches the audio data output to the 12-Seg audio data output (S13).

Here, for example, the switching processing in S13 involves switching the audio data to be outputted to the 12-Seg. The audio data is outputted from the audio data output control unit 101 to an appliance such as an external speaker.

Specifically, first, both of the 12-Seg audio data outputted from the 12-Seg audio decoder 51 and the One-Seg audio data outputted from the One-Seg audio decoder 52 are inputted to the audio data output control unit 101. Then once receiving the both data, the audio data output control unit 101 executes switching processing in S13; suspending outputting the One-Seg audio data which has been outputted, and instead, outputting only the 12-Seg audio data. After the audio data output control unit 101 switches the audio data to be outputted to the 12-Seg audio data, the process proceeds to S15. Instead of suspending outputting the One-Seg audio data and starting outputting the 12-Seg audio data as described above, another approach may be used to execute the process.

When specifying that the broadcasting to be switched to is the One-Seg broadcasting, the audio data output control unit 101 switches the audio data output to the One-Seg audio data output (S14).

The switching processing in S14 involves the audio data output control unit 101 suspending the 12-Seg audio data which has been outputted, and instead, outputting only the One-Seg audio data. After the audio data output control unit 101 switches the audio data to be outputted to the One-Seg audio data, the process proceeds to S15.

It is noted that other techniques than the above one may be used to execute the process for suspending outputting the 12-Seg audio data and starting outputting the One-Seg audio data.

Then the audio data output control unit 101 generates broadcasting switching information (S15).

To generate the broadcasting switching information is to generate information for executing video data output control. The information for executing the video data output control is generated and transmitted to the video data output control unit 102. The information for executing the video data output control includes the fact that the broadcast-to-be-watched has to be switched based on the simulcast information outputted from the simulcast determining unit 80 and the broadcast-to-be-watched-switching information outputted from the broadcast-to-be-watched selecting unit 90. In addition, the information for executing the video data output control includes the fact that the audio data output has been switched either from the 12-Seg to the One-Seg or from the One-Seg to the 12-Seg.

Exemplified here is how the broadcasting switching information is generated in S14. Here the audio data to be outputted is represented in binary: The audio data for the One-Seg and the audio data for the 12-Seg are represented as "0" and "1", respectively. The audio data output control unit 101 outputs either audio data to the video data output control unit 102.

Described above has been how the audio data output control unit 101 executes the process.

For the sake of simplicity, the process of FIG. 5 shows that the audio to be outputted at one point is determined, and that the audio to be outputted is switched as necessary. In reality, the broadcast-to-be-watched-switching information from the audio data output control unit 101 needs to be monitored constantly or at a certain period. When the monitoring is required, the audio data output control unit 101 executes the process shown in FIG. 5.

Any other technique than the above technique shown in the flowchart in FIG. 5 may be used as an audio-to-be-outputted selecting technique employed by the audio data output control unit 101 as far as the technique is reflected in the determination result of whether or not the program is simulcast.

Exemplified next is whether or not the program is simulcast as shown in S15.

Figure 6:
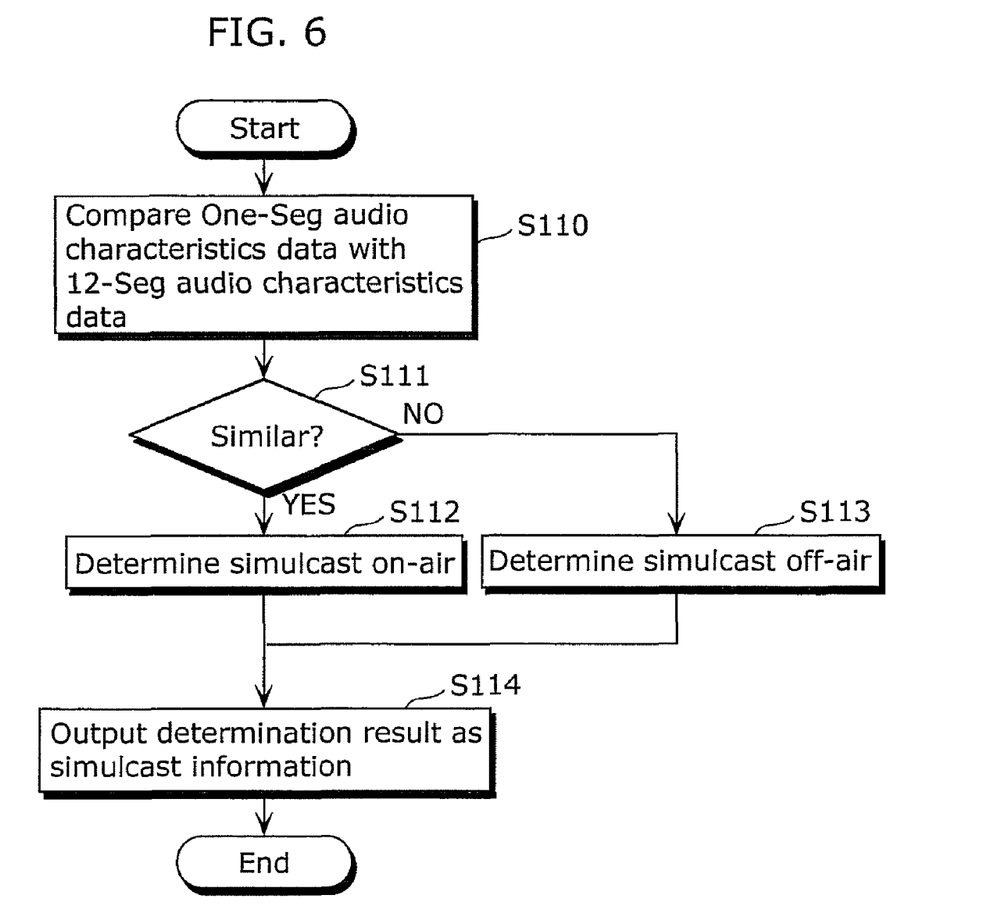
FIG. 6 is a flowchart showing a process of how the simulcast determining unit outputs simulcast information.

FIG. 6 is a flowchart exemplifying a process of how the simulcast determining unit 80 outputs the simulcast information.

First, the simulcast determining unit 80 compares the One-Seg audio characteristics data with the 12-Seg audio characteristics data (S110). In other words, the simulcast determining unit 80 compares the 12-Seg audio characteristics data provided from the first audio data characteristics extracting unit 60 with the One-Seg audio characteristics data provided from the second audio data characteristics extracting unit 70.

Next, the simulcast determining unit 80 determines whether or not the 12-Seg audio characteristics data and the One-seg audio characteristics data are similar (S111).

In the case where both of the audio characteristics data are similar (S111: Yes), the simulcast determining unit 80 determines that the program is simulcast (simulcast on-air) (S112). In the case where the 12-Seg audio characteristics data and the One-Seg audio characteristics data are not similar (S111: No), the simulcast determining unit 80 determines that the program is not simulcast (simulcast off-air) (S113).

Exemplified here is a determination process in S111. The simulcast determining unit 80 compares the length of the soundless period with the soundless period interval for each period No. included in the tables for managing the One-Seg audio characteristics data and the 12-Seg audio characteristics data. Then the simulcast determining unit 80 determines that the program is simulcast only in the case where the length of the soundless period and the soundless period interval in the One-Seg audio characteristics data correspond to those in the 12-Seg data for all the period Nos. included in the tables (S112).

As for a determination technique in S111, any determination technique may be used as far as the technique involves comparing a similarity between the audio characteristics data. For example, the program is simulcast as far as the similarity between the 12-Seg audio characteristics data and the One-Seg audio characteristics data is higher, if not agrees to, than a predetermined reference value. As the similarity of the audio characteristics data, for example, (i) a similarity between the audio data for the 12-Seg and the audio data for the One-Seg in the soundless period or (ii) a similarity between the waveform data for the 12-Seg and the wave form data for the One-Seg in the soundless period interval may be used to determine whether or not the program is simulcast. Here the soundless period interval is also a sound-producing period. Thus the simulcast determining unit 80 may further obtain sound-producing period similarity information indicating (i) a degree of the similarity between the 12-Seg audio data and the One-Seg audio data in the soundless period interval or (ii) a degree of the similarity between the 12-Seg audio wave data and the One-Seg audio data in the soundless period interval. Based on the obtained sound-producing period similarity information, the simulcast determining unit 80 may determine whether or not the program is simulcast.

Next, the simulcast determining unit 80 outputs the determination result obtained in S111 as the simulcast information (S114).

As described above, the simulcast determining unit 80 has executed the process to output the simulcast information.

Described next is a technique to calculate the One-Seg audio characteristics data and the 12-Seg audio characteristics data in S110.

Figure 7:
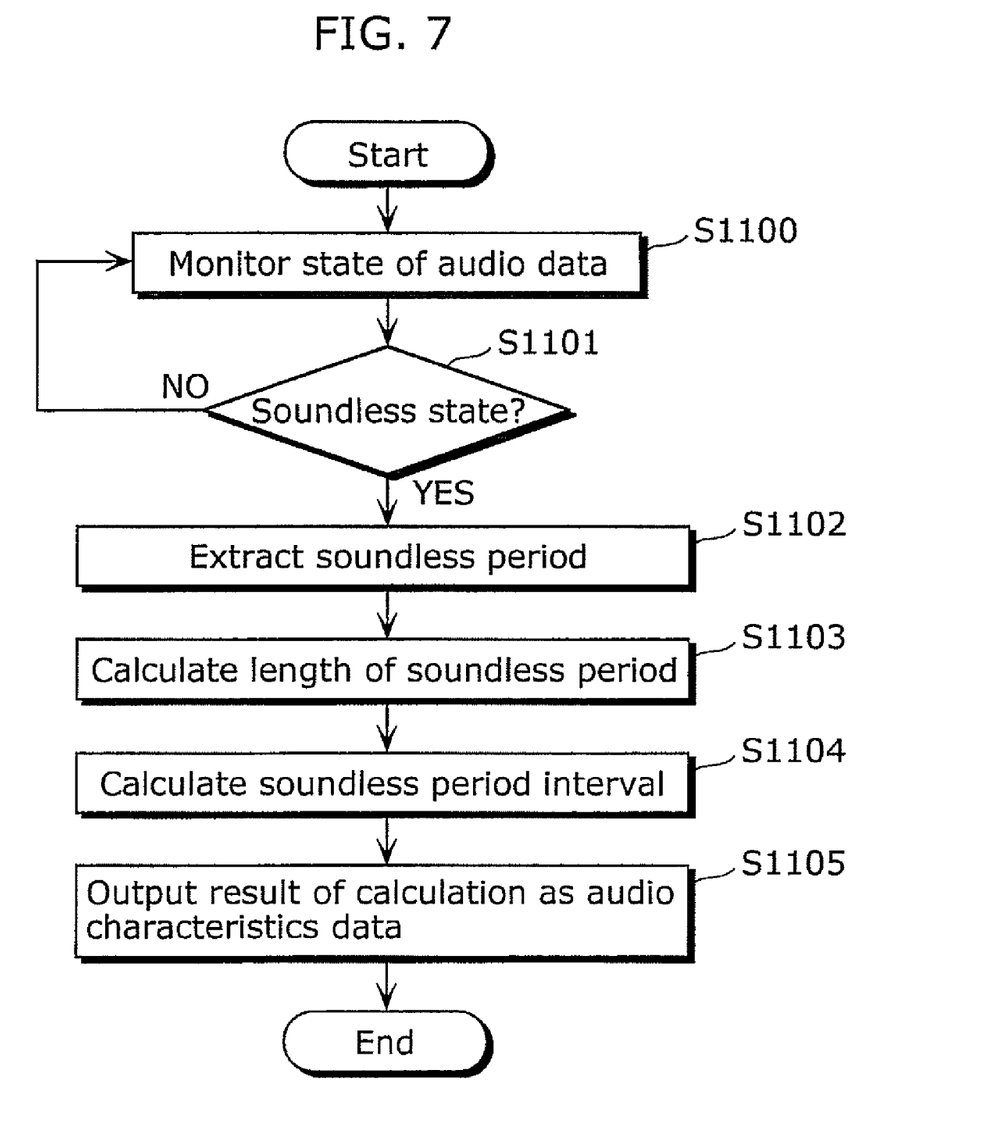
FIG. 7 is a flowchart showing a process of how a first audio data characteristics extracting unit outputs 12-Seg audio characteristics data.

FIG. 7 is the flowchart exemplifying a process of how the first audio data characteristics extracting unit 60 outputs the 12-Seg sound characteristics data.

First, the first audio data characteristics extracting unit 60 monitors a state of the 12-Seg audio data decoded by the 12-Seg audio decoder 51 (S1100).

Then the first audio data characteristics extracting unit 60 determine whether or not the 12-Seg audio data is in the soundless state (S1101). In the case where the first audio data characteristics extracting unit 60 determines that the audio data is not in the soundless state; that is in the sound-producing state (S1101: No), the process goes back to S1100.

Next, in the case where determining that the 12-Seg audio data is in the soundless state, the first audio data characteristics extracting unit 60 extracts the soundless period included in the audio data (S1102).

Then the first audio data characteristics extracting unit 60 calculate the length of the soundless period; that is, the length of the extracted soundless period (S1103).

Next the first audio data characteristics extracting unit 60 calculates the soundless period interval indicating the difference between the start time of the extracted soundless period and the finish time of the previously extracted soundless period (S1104).

Then the first audio data characteristics extracting unit 60 outputs, to the simulcast determining unit 80, the length of the soundless period calculated in S1103 and the soundless period interval calculated in S1104 (S1105). Here the length of the soundless period and the soundless period interval are part of the 12-Seg audio characteristics data.

As described above, the first audio data characteristics extracting unit 60 executes the process to output the 12-Seg audio characteristics data.

It is noted that how the second audio data characteristics extracting unit 70 outputs the One-Seg audio characteristics data is similar to that shown in FIG. 7. Thus the details thereof shall be omitted.

Exemplified next is how video data output control unit 102 selects video data to be outputted.

Figure 8:
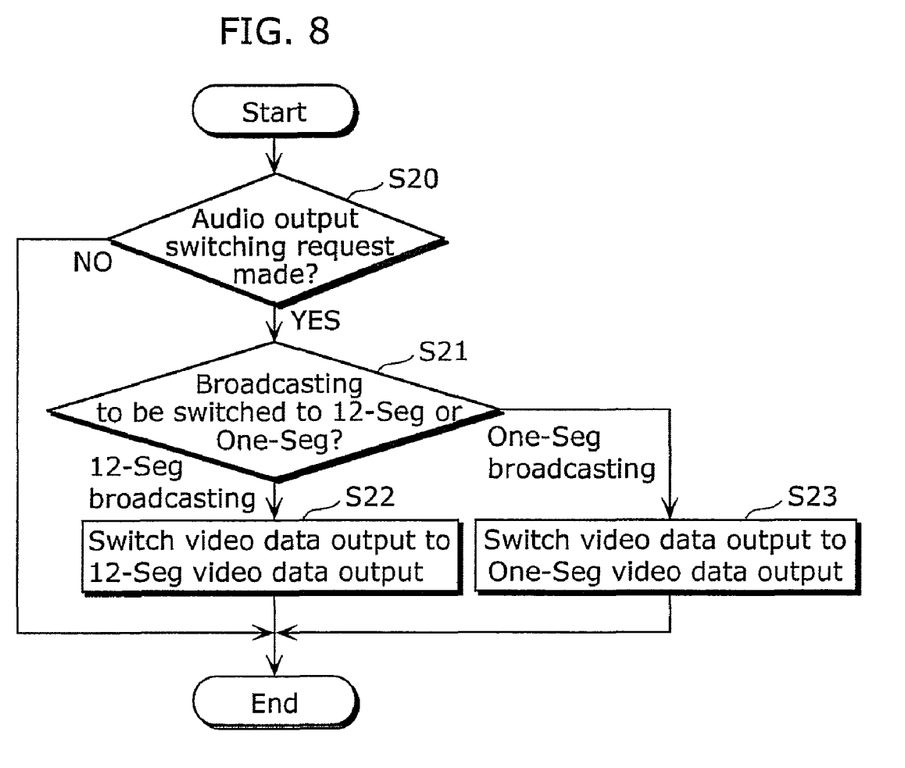
FIG. 8 is a flowchart showing a process executed by a video data output control unit.

FIG. 8 is a flowchart showing a process executed by the video data output control unit 102.

First the video data output control unit 102 obtains the broadcasting switching information outputted from the audio data output control unit 101. Then, based on the obtained broadcasting switching information, the video data output control unit 102 determines whether or not one of the requests has been made; (i) an audio output switching request from the 12-Seg video data to the One-Seg video data, and (ii) an audio output switching request from the One-Seg video data to the 12-Seg video data (S20).

Exemplified here is a determination process in S20. Specifically, in a storage area of the broadcast receiving apparatus 200, storage is reserved for video data. When the video data to be outputted is for the One-Seg video data, a "0" is recorded. When the video data to be outputted is for the 12-Seg video data, a "1" is recorded. The broadcast-to-be-watched-switching information outputted from the audio data output control unit 101 is represented in binary. In such a case, when, in S20, the number in the storage for audio data does not correspond to the number of broadcasting switching information outputted from the audio data output control unit 101, the video data output control unit 102 determines that the broadcast-to-be-watched has been switched and the audio output switching request has been made, and the step proceeds to S21. When the numbers correspond, the process ends.

Next, when the video data output control unit 102 determines that the audio output switching request has been made in S20, the video data output control unit 102 determines whether the broadcasting to be switched to is the 12-Seg broadcasting or the One-Seg broadcasting (S21).

Exemplified here is a specifying process in S21. The video data output control unit 102 specifies the broadcasting to be switched to according to the broadcasting switching information. When the broadcast-to-be-watched-switching information is the "1", the process proceeds to S22. When the broadcast-to-be-watched-switching information is the "0", the process proceeds to S23.

When specifying that the broadcasting to be switched to is the 12-Seg broadcasting, the video data output control unit 102 switches the video data output to the 12-Seg video data output (S22).

Here, for example, the switching processing in S22 involves switching the video data to be outputted between the One-Seg and the 12-Seg. The video data is outputted from the video data output control unit 102 to an appliance such as an external monitor.

Specifically, first, both of the 12-Seg video data outputted from the 12-Seg video decoder 53 and the One-Seg video data outputted from the One-Seg video decoder 54 are inputted to the video data output control unit 102. Then once receiving the both data, the video data output control unit 102 executes switching processing in S22; suspending outputting the One-Seg video data which has been outputted, and instead, outputting only the 12-Seg video data. After the video data output control unit 102 switches the video data to be outputted to the 12-Seg video data, the process ends. Instead of suspending outputting the One-Seg video data and starting outputting the 12-Seg video data as described above, another approach may be used to execute the process.

When specifying that the broadcasting to be switched to is the One-Seg broadcasting, the video data output control unit 102 switches the video data output to the One-Seg video data output (S23).

In the switching processing in S23, the video data output control unit 102 suspends the 12-Seg video data which has been outputted, and instead, outputs only the One-Seg video data. After the video data output control unit 102 switches the video data to be outputted to the One-Seg video data, the process ends. Instead of suspending outputting the 12-Seg video data and starting outputting the 12-Seg video data as described above, another approach may be used to execute the process.

Described above has been how the video data output control unit 102 executes the process.

As described above, the broadcast receiving apparatus 200 according to Embodiment 1 determines whether or not the broadcast is simulcast based on whether or not the 12-Seg audio characteristics data and the One-Seg audio characteristics data are similar. Hence even though a broadcast station does not set information, which indicates how the simulcast is provided, in the TMCC signal, and thus does not provide the simulcast, the broadcast receiving apparatus 200 according to Embodiment 1 can determine whether or not the 12-Seg broadcasting and the One-Seg broadcasting are simulcast. Some broadcasting is simulcast with a soundless state continuing. In such a case, the broadcast receiving apparatus 200 according to Embodiment 1 can exactly determine that the broadcasting is simulcast, and switch the broadcast-to-be-watched between the 12-Seg broadcasting and the One-Seg broadcasting.

As described above, the present invention implements the broadcast receiving apparatus and the broadcast receiving circuit which can exactly determine whether or not the broadcasting is simulcast.

(Embodiment 2)

Employing the structure of Embodiment 1, Embodiment 2 introduces a technique to switch from the simulcast 12-Seg broadcasting to the simulcast One-Seg broadcasting without making the viewer feel uncomfortable, taking into consideration a time lag between the 12-Seg broadcasting and the One-Seg broadcasting.

It is noted that the structure shown in Embodiment 2 is similar to that of Embodiment 1. Thus the details thereof shall be omitted.

As described above, there is a time lag between the 12-Seg broadcasting and the One-Seg broadcasting in the simulcast operating system in Japan.

The time lag between the 12-Seg broadcasting and the One-Seg broadcasting can be extracted in the form of information indicating the difference between the soundless period finish time and the soundless period start time generated during the process ((a) to (e) in FIG. 3, for example) of determining whether or not the broadcasting is simulcast.

Figure 9:
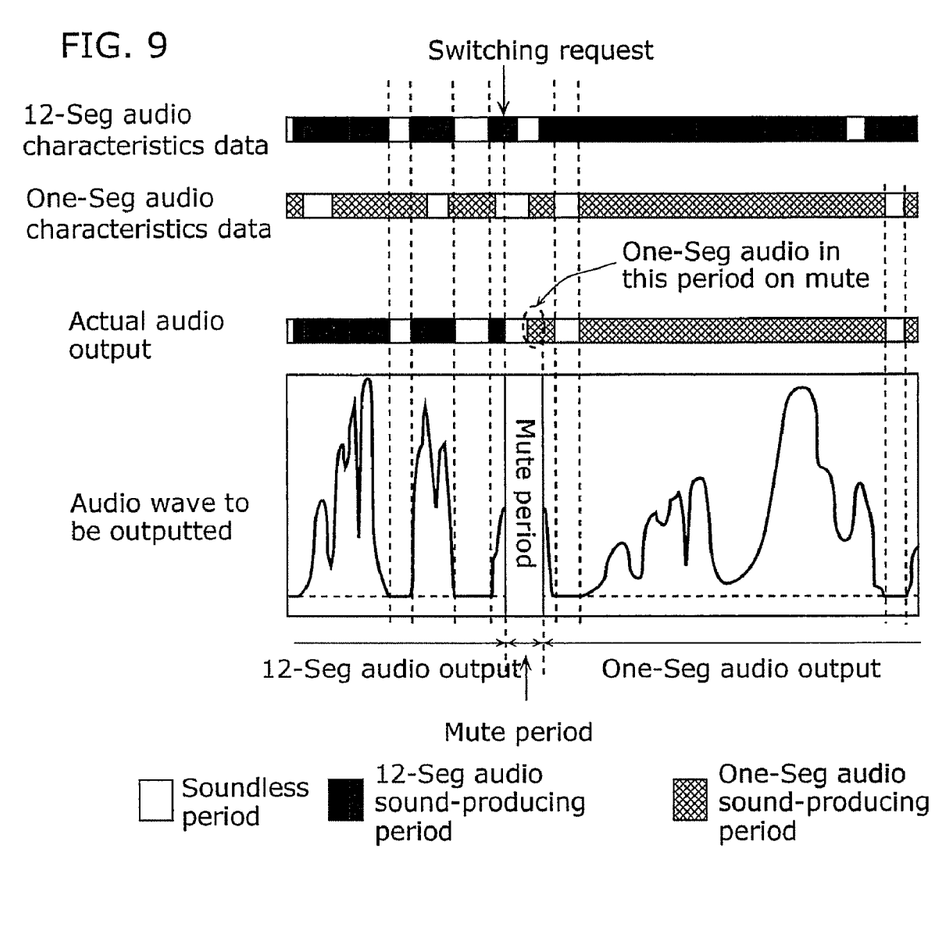
FIG. 9 exemplifies how audios are switched between the 12-Seg broadcasting and the One-Seg broadcasting, taking into consideration a time lag between a 12-Seg broadcasting and a One-Seg broadcasting.

FIG. 9 exemplifies how audios are switched between the 12-Seg broadcasting and the One-Seg broadcasting, taking into consideration a time lag between the 12-Seg broadcasting and the One-Seg broadcasting.

In the Embodiment 2 in FIG. 9, the following operations are illustrated: In the case where a switching request is made to switch the broadcasting to the One-Seg audio output when the 12-Seg audio is outputted, the audio data output control unit 101 avoids immediate switching from the 12-Seg audio output to the One-Seg audio output. Instead, the audio data output control unit 101 once sets the audio to be outputted on mute, and starts outputting the One-Seg audio. The mute period is determined based on the difference between the soundless period start time of the 12-Seg audio characteristics data and that of the One-Seg audio characteristics data. Here both of the data are extracted for the calculation of the soundless period interval. In other words, the audio data output control unit 101 sets the audio to be outputted on mute as long as the calculated time difference lasts. Then the audio data output control unit 101 starts outputting the One-Seg audio.

The audio data output control unit 101 determines that the broadcasts are simulcast, recognizes that the broadcasts provide the same program, and switches to the broadcast-to-be-watched. Executing the above operations, the audio data output control unit 101 also prevents the audio which has been outputted in the 12-Seg broadcasting from being outputted again once the broadcast has been switched to the One-Seg broadcast, so that the viewer does not feel the broadcast replayed.

It is noted that when switching from the One-Seg broadcasting to the 12-Seg broadcasting, the audio data output control unit 101 can immediately switch the broadcasting as soon as the broadcast-to-be-watched switching request is made. This is because the One-Seg broadcasting is relatively behind the 12-Seg broadcasting. Furthermore, the audio data output control unit 101 may switch the broadcasting when either the One-Seg broadcasting or the 12-Seg broadcasting is in the soundless period.

As a modification of Embodiment 2, the video data output control unit 102 can prevent replaying the same video, corresponding to the audio, twice for the 12-Seg broadcasting and the One-Seg broadcasting with respect to the audio output. Thus the video data output control unit 102 can alleviate an uncomfortable feeling which the viewer has when the broadcasting switches from the 12-Seg broadcasting to the One-Seg broadcasting.

As described above, Embodiment 2 in the present invention implements the broadcast receiving apparatus and the broadcast receiving circuit which can exactly determine whether or not the broadcasting is simulcast. Moreover, the mute is set on the audio to be outputted in switching from the 12-Seg broadcasting to the One-Seg broadcasting, so that an uncomfortable feeling which the user has can be alleviated.

It is noted that the broadcast receiving apparatuses and the broadcast receiving circuits in Embodiments 1 and 2 exactly determine whether or not the broadcasting is simulcast in the Japanese terrestrial digital TV broadcasting system; however, the broadcast receiving apparatuses and the broadcast receiving circuits shall not be limited to ones for the Japanese terrestrial digital TV broadcasting. The broadcast receiving apparatuses and the broadcast receiving circuits in Embodiments 1 and 2 are intended to be included within the scope of this invention in the case where a non-Japanese TV broadcasting system applies the simulcast.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

Industrial Applicability

The present invention is applicable to broadcast receiving circuits and broadcast receiving apparatuses, and in particular, to a broadcast receiving circuit and a broadcast receiving apparatus which can select between the 12-Seg broadcasting and the One-Seg broadcasting on a specific channel in digital broadcasting, and which can view the selected broadcasting.

What is claimed is:

1. A broadcast receiving circuit which receives broadcast waves including a first service and a second service, and outputs either (i) audio data and video data included in the first service or (ii) audio data and video data included in the second service, said broadcast receiving circuit comprising: a first extracting unit configured to extract a first soundless period and first interval information from first audio data included in the first service, the first soundless period showing that an audio level which indicates volume of audio is as low as a predetermined audio level or below, and the first interval information indicating a time period between the first soundless period and a soundless period subsequent to the first soundless period;

a second extracting unit configured to extract a second soundless period and second interval information from second audio data included in the second service, the second soundless period showing that an audio level which indicates volume of audio is as low as a predetermined audio level or below, and the second interval information indicating a time period between the second soundless period and a soundless period subsequent to the second soundless period;

a simulcast determining unit configured to determine whether or not the broadcast waves are simulcast by comparing the first interval information with the second interval information; and     a switching control unit configured to switch between (i) the output of the audio data and the video data included in the first service and (ii) the output of the audio data and the video data included in the second service based on a result of the determination by said simulcast determining unit.

2. The broadcast receiving circuit according to claim 1, wherein said simulcast determining unit is configured to compare a time period indicated in the first interval information with a time period indicated in the second interval information, and, in the case where a similarity between the time periods is higher than a threshold, to determine that the broadcast waves are simulcast.

3. The broadcast receiving circuit according to claim 1, wherein said simulcast determining unit is further configured to (i) extract the first audio data in a sound-producing period included in the time period indicated in the first interval information, (ii) extract the second audio data in a sound-producing period included in the time period indicated in the second interval information, and (iii) determine whether or not the broadcast waves are simulcast based on sound-producing period similarity information indicating a similarity between the extracted first audio data and second audio data.

4. The broadcast receiving circuit according to claim 1, wherein, when switching from the output of the audio data and the video data included in the first service to the output of the audio data and the video data included in the second service, said switching control unit is further configured to set, on mute, an audio output found during the switching from the first audio data to the second audio data based on information indicating a difference between (i) the first soundless period extracted from the first audio data by said first extracting unit and (ii) the second soundless period paired with the first soundless period, and extracted from the second audio data by said second extracting unit.

5. The broadcast receiving circuit according to claim 4, wherein, when setting, on mute, the audio output found during the switching from the first audio data to the second audio data, said switching control unit is configured to output, as a still image, one of images of video found during the switching from the video data included in the first service to the video data included in the second service.

6. A broadcast receiving apparatus which receives broadcast waves including a first service and a second service, and outputs either (i) audio data and video data included in the first service or (ii) audio data and video data included in the second service, said broadcast receiving circuit comprising:

a first extracting unit configured to extract a first soundless period and first interval information from first audio data included in the first service, the first soundless period showing that an audio level which indicates volume of audio is as low as a predetermined audio level or below, and the first interval information indicating a time period between the first soundless period and a soundless period subsequent to the first soundless period;

a second extracting unit configured to extract a second soundless period and second interval information from second audio data included in the second service, the second soundless period showing that an audio level which indicates volume of audio is as low as a predetermined audio level or below, and the second interval information indicating a time period between the second soundless period and a soundless period subsequent to the second soundless period;

a simulcast determining unit configured to determine whether or not the broadcast waves are simulcast by comparing the first interval information with the second interval information; and a switching control unit configured to switch between (i) the output of the audio data and the video data included in the first service and (ii) the output of the audio data and the video data included in the second service based on a result of the determination by said simulcast determining unit.

7. The broadcast receiving apparatus according to claim 6, wherein said simulcast determining unit is configured to compare a time period indicated in the first interval information with a time period indicated in the second interval information, and, in the case where a similarity between the time periods is higher than a threshold, to determine that the broadcast waves are simulcast.

8. A broadcast receiving method for receiving broadcast waves including a first service and a second service, and outputting either (i) audio data and video data included in the first service or (ii) audio data and video data included in the second service, said broadcast receiving method comprising:

extracting a first soundless period and first interval information from first audio data included in the first service, the first soundless period showing that an audio level which indicates volume of audio is as low as a predetermined audio level or below, and the first interval information indicating a time period between the first soundless period and a soundless period subsequent to the first soundless period;

extracting a second soundless period and second interval information from second audio data included in the second service, the second soundless period showing that an audio level which indicates volume of audio is as low as a predetermined audio level or below, and the second interval information indicating a time period between the second soundless period and a soundless period subsequent to the second soundless period;

determining whether or not the broadcast waves are simulcast by comparing the first interval information with the second interval information; and switching between (i) the output of the audio data and the video data included in the first service and (ii) the output of the audio data and the video data included in the second service based on a result of the determination in said determining.

9. A non-transitory computer-readable recording medium which stores a program for receiving broadcast waves including a first service and a second service, and outputting either (i) audio data and video data included in the first service or (ii) audio data and video data included in the second service, wherein the program causing a computer to execute:

extracting a first soundless period and first interval information from first audio data included in the first service, the first soundless period showing that an audio level which indicates volume of audio is as low as a predetermined audio level or below, and the first interval information indicating a time period between the first soundless period and a soundless period subsequent to the first soundless period;

extracting a second soundless period and second interval information from second audio data included in the second service, the second soundless period showing that an audio level which indicates volume of audio is as low as a predetermined audio level or below, and the second interval information indicating a time period between the second soundless period and a soundless period subsequent to the second soundless period;

determining whether or not the broadcast waves are simulcast by comparing the first interval information with the second interval information; and switching between (i) the output of the audio data and the video data included in the first service and (ii) the output of the audio data and the video data included in the second service based on a result of the determination in said determining.

\* \* \* \* \*